United States Patent [19]

Steigelmann et al.

[11] 3,940,469
[45] Feb. 24, 1975

[54] PROCESS FOR FORMING HOLLOW FIBERS

[75] Inventors: Edward F. Steigelmann; Robert D. Hughes, both of Park Forest, Ill.; Joseph Gabor, Whiting, Ind.

[73] Assignee: Standard Oil Company, Chicago, Ill.

[22] Filed: Nov. 26, 1973

[21] Appl. No.: 419,091

[52] U.S. Cl...... 264/177 F; 210/321 R; 210/500 M; 260/2.5 N; 260/29.2 N; 260/29.6 WB; 260/857 UN; 264/205; 264/209; 428/398
[51] Int. Cl.² ...................... D01D 5/04; D01D 5/24
[58] Field of Search........ 260/2.5 N, 29.6 B, 857 U, 260/30.8 DS, 72 N, 29.6 NR, 29.2 N; 264/185, 205, 209, 177 F; 210/321, 500 M; 428/398

[56] References Cited
UNITED STATES PATENTS

| | | | |
|---|---|---|---|
| 2,405,965 | 8/1946 | Leekley | 260/29.2 N |
| 2,773,286 | 12/1956 | Piccard et al. | 260/2.5 N |
| 2,955,017 | 10/1960 | Boyer | 264/184 |
| 3,063,787 | 11/1962 | Rynkiewicz et al. | 264/185 |
| 3,080,350 | 3/1963 | Imai et al. | 260/89.1 |
| 3,161,699 | 12/1964 | Matsubashi et al. | 260/898 |
| 3,242,120 | 3/1966 | Steuber | 260/29.6 AN |
| 3,355,409 | 11/1967 | Bissot | 260/29.2 N |
| 3,366,606 | 1/1968 | Chiddix et al. | 260/29.2 N |
| 3,408,315 | 10/1968 | Paine | 260/29.2 N |
| 3,674,628 | 7/1972 | Fabre | 161/178 |
| 3,705,207 | 12/1972 | Sills | 260/857 U |
| 3,752,784 | 8/1973 | Jenkins | 260/2.5 N |
| 3,833,708 | 9/1974 | Miller et al. | 264/344 |

*Primary Examiner*—Jay H. Woo
*Attorney, Agent, or Firm*—Morton, Bernard, Brown, Roberts & Sutherland

[57] ABSTRACT

Hollow membrane fibers are formed from a mixture of N-alkoxyalkyl polyamide, polyvinyl alcohol, di(lower alkyl) sulfoxide and water. The fibers are useful for separating chemicals, e.g., aliphatically-unsaturated hydrocarbons, from mixtures containing them.

12 Claims, No Drawings

PROCESS FOR FORMING HOLLOW FIBERS

This invention relates to the formation of hollow membrane fibers by the use of compositions containing N-alkoxyalkyl polyamide and polyvinyl alcohol. More specifically, the invention concerns the formation of such fibers from mixtures containing the N-alkoxyalkyl polyamide, polyvinyl alcohol, di(lower alkyl) sulfoxide and water. The fibers are particularly useful for separating chemicals, e.g. aliphatically-unsaturated hydrocarbons, from mixtures containing them by the combined use of liquid barrier permeation and metal-complexing techniques. A separation of particular interest is that of ethylene from one or both of methane and ethane, with or without the presence of hydrogen.

In U.S. patent application Ser. No. 395,055, filed Sept. 7, 1973, it is disclosed that hollow fibers can be made by extruding mixtures containing N-alkoxyalkyl polyamide, polyvinyl alcohol and di(lower alkyl) sulfoxide. The fibers are particularly useful in separating aliphatically-unsaturated hydrocarbons from mixtures containing them. In these separation procedures, it is preferred that the membranes be in the form of hollow fibers since they offer the advantages of high surface area per unit volume, thin fiber walls for high permeation rates, favorable ratios of fiber outside diameter to inside diameter in order to withstand high pressures, and low cost per square foot per area of membrane surface. Although one could consider forming these fibers by melting together the N-alkoxyalkyl polyamide and polyvinyl alcohol to provide a mixture of extrusion consistency, this procedure is disadvantageous since the polymers start to decompose before their melting point is reached. The provision of a di(lower alkyl) sulfoxide such as dimethyl sulfoxide (DMSO), in the mixture leads to the successful formation of useful fibers by a hot extrusion technique, and such preparations are described in the above-identified patent application. The temperatures used in this operation are, however, frequently sufficiently elevated that some undesirable reaction, e.g. decomposition, of the polymers may occur and cause them to become discolored. Also, the polymers may become unduly cross-linked to make their extrusion difficult, if not impossible, and the polymers may react with the di(lower alkyl) sulfoxide.

When the mixture of polymers is melted with DMSO at temperatures in the range of about 120° to 150°C. it is generally stirred vigorously and the melting may require a considerable period of time, e.g. about 2 hours in certain types of equipment. The polymers and DMSO may also be held as a melt for a period of time while the mixture is in a tank used to supply feed to the extruder. The greater the temperature of the mixture or the greater the time it is maintained at elevated temperatures, the more severe is the heating operation and the greater the tendency of the polymers to undergo undesirable reactions. These reactions may be indicated by the mixture turning brown, and at very severe conditions, e.g. 150°C. for 4 hours, the melt may form a dark brown, tarry mass.

By the present invention, it has been found that the provision of water in the extrusion mixture containing the N-alkoxyalkyl polyamide, polyvinyl alcohol and di(lower alkyl) sulfoxide inhibits the degradation of the polymer-di(lower alkyl) sulfoxide system and significantly reduces the likelihood of encountering the problems. By the use of water in the extrusion mixture, a relatively uniform composition can be made with little, if any, decomposition of the polymers occurring, before or during extrusion.

The compositions of the present invention which are used to form the hollow fibers are composed of N-alkoxyalkyl polyamide, polyvinyl alcohol, di(lower alkyl) sulfoxide and water. The compositions are generally comprised of hydrophilic, fiber-forming amount of the polyamide and polyvinyl alcohol, say about 30 to 85, preferably about 40 to 70, weight percent of N-alkoxyalkyl polyamide; and about 15 to 70, preferably about 30 to 60, weight percent polyvinyl alcohol based on the total weight of these components. The composites contain sufficient of the di(lower alkyl) sulfoxde to provide an intimate, compatible admixture of the polyamide and polyvinyl alcohol suitable for forming the membrane. These compositions may often contain about 70 to 400 weight percent of the di(lower alkyl) sulfoxide, preferably about 90 to 250 weight percent, based on the total weight of the polyamide and polyvinyl alcohol. The water in the mixture is generally a sufficient amount to inhibit the degradation of the mixture of polymers and di(lower alkyl) sulfoxide at elevated temperatures, but the amount is not so large that the mixture is incompatible or no longer of fiber-forming, e.g. extrusion, consistency. The amount of water present in the composition is often about 1 to 30 weight percent, preferably about 2 to 20 weight percent, based on the total of the water and di(lower alkyl) sulfoxide. If the amount of water is too great difficulties in melting the polymer may be encountered, while if the amount of water is too low problems with regard to degradation of the polymer may result.

The hollow fibers can be made by extrusion of the N-alkoxyalkyl polyamide, polyvinyl alcohol, di(lower alkyl) sulfoxide and water mixture. To facilitate handling, the mixture can be allowed to gel which may also decreases any tendency towards separation of the polymer and solvent components during melting of the mixture. A suitable process for extruding the fibers involves providing the mixture having the polymers in solution at an elevated temperature suitable for extrusion, for instance, a temperature of about 60° to 125°C., preferably about 70° to 110°C. Heating of the compositions under severe temperature-time conditions, e.g. 150°C. for 4 hours, can lead to reactions which discolor the mixture and may even cause the formation of unusable dark brown, tarry masses. Excessive degradation should be avoided and we prefer that the compositions not be heated under conditions which cause any significant discoloration. The hot material is extruded to form fibers having a hollow core surrounded by the membrane wall. During extrusion it is advantageous to pass a gas through the core of the hollow fibers to help cool the fibers and prevent the core of the fibers from closing.

After extrusion the fibers can be dried or otherwise treated to remove the di(lower alkyl) sulfoxide and water. If the di(lower alkyl) sulfoxide is allowed to remain in the fibers in significant quantities, the fibers may be deleteriously affected over a period of time. For example, if the di(lower alkyl) sulfoxide, e.g. DMSO, remains in the fiber for extended periods, the fiber may become paste-like in appearance. If removal of the di(lower alkyl) sulfoxide from the fibers is postponed after forming, the fibers may be weaker than if the di(lower alkyl) sulfoxide had been withdrawn sooner. Thus we prefer to remove most, if not essentially all, of the di(lower alkyl) sulfoxide from the fibers more or less immediately after they are formed from the solution. A preferred method of removal is by drying at an elevated temperature, e.g. about 60° to 110°C., with shorter times being usable at higher temperatures.

Other methods for removing di(lower alkyl) sulfoxide from the fibers may be employed. These techniques include solvent washing procedures in which the fibers are contacted at suitable temperatures with a liquid organic solvent for the di(lower alkyl) sulfoxide. The solvent and temperatures employed should not unduly dissolve or otherwise deleteriously affect the fiber, and washing temperatures from below ambient to about 75°C., may suitably be employed. Among the suitable organic solvents are the oxygen-containing solvents such as the lower aliphatic ketones, e.g. acetone, and lower alkanols, e.g., methanol and isopropanol, and the low molecular weight paraffins or halogenated paraffins, e.g. the chlorinated paraffins, e.g., chloroform. The solvents may be partially miscible with the di(-lower alkyl) sulfoxide and water, and do not significantly dissolve, swell or react with the polymers present.

In one fiber-forming procedure we have employed, the fibers are extruded into a quench bath containing one or more of the foregoing described solvents, e.g., acetone or isopropanol, and soaked for a period of about 15 minutes to 2 hours or more. The temperature of the quench bath may suitably be from below ambient, e.g. down to about −20°C., to up to about 75°C. The fibers are then removed from the bath, dried, say at 75°C. for 2 hours; or annealed, e.g. at 125° to 200°C. for up to 4 minutes, and then dried, for instance, after cross-linking and water-washing. The hollow fibers have sufficient thickness so as not to be readily ruptured or otherwise undergo physical deterioration at a rate that would make their use unattractive. Generally the thickness of the fiber wall may be up to about 30 mils or more, preferably about 0.5 to 15 mils, and often the thickness is at least about 0.1 mil. The overall diameter of the fiber may usually be up to about 75 or more mils, preferably about 1 to 30 mils.

The physical characteristics of the membranes, e.g. their strength and chemical resistance, may be enhanced by cross-linking the polyamide or the polyvinyl alochol. Cross-linking of the polyamide can be accomplished by contact of the fibers with an organic or inorganic acidic catalyst such as a sulfonic acid of an aromatic hydrocarbon, mild nitric acid and the like. Such catalysts may, for instance, be naphthalene or toluene sulfonic acids, and cross-linking can be accomplished at elevated temperatures. During contact of the fibers with the acid catalyst as an aqueous solution, it is preferred that a water-soluble alkali metal salt be dissolved in the solution to maintain the integrity of the polyvinyl alcohol by reducing its tendency to dissolve in the aqueous catalyst solution. Cross-linking or other modification of the polymer composition may be effected before, during or after it is formed into the fiber, but if the modification occurs before fiber-formation it should not be so extensive that the fiber-formation may not be accomplished.

The properties, for instance, the strength and permeability, of the membrane fibers may be improved by drawing or stretching them and this can be accomplished at ambient or elevated temperatures. Suitable elevated temperatures include about 90° to 300°C., preferably about 125° to 200°C. The fibers may also be annealed at such temperatures, and the stretching and annealing may be accomplished simultaneously. The drawn fibers have a reduced overall diameter and thinner walls than before stretching whether at ambient or elevated temperature, and this treatment may preferably increase the length of the fibers by a factor of at least about 1.25, say up to about 10 or more. The treatment may decrease the thickness of the walls to where they are less than about 0.5 of the thickness they had before stretching. Excessive stretching may adversely affect the strength and performance of the fibers and thus we prefer that their length not be increased by a factor of more than about 9.

The stretching of the fibers is preferably accomplished when they are swollen with an aqueous or organic liquid, especially when stretching is conducted essentially at room or ambient temperature. The swelling agent is preferably water, but it may be an organic swelling agent such as those listed below as swelling agents. The amount of swelling agent present during stretching is often a minor amount up to about 50 weight percent of the fiber, and preferably is at least about 1 weight percent. The presence of the swelling agent may make stretching easier, e.g. require less force or lower temperatures for the same stretch. The swelling may preserve a place in the polymer structure for the complex-forming solution which is later incorporated in the fibers.

Stretching the fibers generally results in an increase in length proportional to the square of the reduction in the internal and external diameters of the fibers. The rate of stretching and the time the fibers are at elevated temperatures can affect their properties. Reduction in diameter upon stretching the fibers can be a very rapid process. Thus applying a force of several hundred grams to a fiber at 200°F. for 0.1 of a minute may stretch the fiber adequately. Maintaining thus force and temperature over several minutes has not greatly increased the amount of stretch. The maintenance of the elevated temperature may cause plastic flow within the fiber which tends to heal any voids produced during the stretching process. Thus, in our process we would prefer keeping the fiber at elevated temperatures for a longer time than is required just for stretching to benefit from the annealing or healing process.

The materials which are employed to make the semipermeable film membranes of the present invention, have a film-forming N-alkoxyalkyl polyamide as an essential component. The polyamide film-forming materials are generally known and have also been designated as nylons. The polymers are characterized by having a plurality of amide groups serving as recurring linkages between carbon chains in the product structure, and the polymers may be made by several procedures. Commonly, the polyamides are formed by reacting a polyamine and a dicarboxylic acid or its derivatives such as an ester, especially a lower alkyl ester having, for instance, about 1 to 4 carbon atoms in the ester group. Other reactions which may be employed to form the polyamides include the self-condensation of monoamino, monocarboxylic acids and the reactions of cyclic lactams. In any event, the polyamide products contain recurring amide groups as an integral part of the principal polymer chain. The polyamides are described, for instance, in the Kirk-Othmer, *Encyclopedia of Chemical Technology*, Second Edition, Volume 16, beginning at page 1, Interscience Publishers, New York, 1968. Among the typical structural formulas of the linear polyamides are H$_2$NRNH(COR'CONHRNH)$_n$COR'COOH and H$_2$NRCO(NHRCO)$_n$NHRCOOH, where R and R' represent primarily carbon-to-carbon chains between functional groups in the reactants, and $n$ represents the degree of polymerization or the number of recurring groups in the polymer chain. The polyamides which can be used in this invention are generally solid at room temperature, and have a molecular weight which makes them suitable for forming the desired membranes, for example, about 8,000 to 20,000.

The carboxylic acids which may be used in forming the polyamides have an acyloxy group (—R—COO—) in their structure and the R member of this group is composed essentially of carbon and hydrogen and often contains about 6 to 12 carbon atoms. Such groups may be aliphatic, including cycloaliphatic, aromatic, or a mixed structure of such types, but the groups are preferably aliphatic and saturated with respect to carbon-to-carbon linkages. These R groups may preferably have straight chain carbon-to-carbon or normal structures. Among the useful dicarboxylic acid reactants are adipic acid, sebacic acid, azelaic acid, isophthalic acid, terephthalic acid, and the methyl esters of these acids.

The polyamines employed in making the polyamides generally have at least two non-tertiary, amino nitrogen atoms. These nitrogen atoms may be primary or secondary in configuration, although amines having at least two primary nitrogen atoms are preferred. The polyamines may also have both primary and secondary nitrogen atoms and the polyamines may contain tertiary nitrogen atoms. The preferred polyamine reactants have aliphatic, including cycloaliphatic, structures, and often have from 2 to about 12 carbon atoms. Also, the preferred polyamines are saturated and have straight-chain structures, although branched-chain polyamines can be used. Among the useful polyamines are ethylene diamine, pentamethylene diamine, hexamethylene diamine, diethylene triamine, decamethylene diamine and their N-alkyl substituted derivative, for instance, the lower alkyl derivatives which may have, for instance, 1 to 4 carbon atoms in the alkyl substituents.

The polyamide polymers which are employed in this invention are those in which the film-forming polyamide is an N-alkoxyalkyl-substituted polyamide. Materials of this type are well known, as shown, for instance, by U.S. Pat. Nos. 2,430,910 and 2,430,923, which disclose N-alkoxymethyl polyamides made by the reaction of a polyamide polymer, formaldehyde and alcohol. Generally, at least about 5% of the amide groups of the polymer are substituted with alkoxyalkyl groups and such substitution may be up to about 60% or more. Preferably, this substitution is about 10 to 50% with the product being soluble in hot ethanol. Advantageously, these polymers themselves are hydrophilic and absorb at least about 5 weight percent water when immersed in distilled water for one day at room temperature and pressure.

The alcohols employed in making the N-alkoxyalkyl polyamides are generally monohydric and may have, for instance, from 1 to about 18 or more carbon atoms. The lower alkanols are preferred reactants, especially the lower alkanols having 1 to 4 carbon atoms. Among the useful alcohols are methanol, propanols, butanols, oleyl alcohol, benzyl alcohol, lauryl alcohol and alcohol ethers, for instance, the alkyl ethers of ethylene glycol.

The N-alkyloxyalkyl polyamides employed in the present invention to provide the desired semi-permeable membrane may be reacted with cross-linking agents, especially after the fibers are formed. For instance, the fibers may be combined with the cross-linking agent and these materials may react under the influence of heat. The cross-linking agents may be, for example, polycarboxylic acids, especially the dicarboxylic and tricarboxylic acids which may have, for instance, from 2 to about 12 carbon atoms. Useful acids include oxalic acid, citric acid, maleic acid, and the like. The water-soluble, alkali metal salts of the polycarboxylic acids, e.g. sodium citrate, may be present in the composition during formation of the fibers. Upon acidifying the polymers, the corresponding carboxylic acid is formed and may serve to cross-link the N-alkoxyalkyl polyamide. If a polycarboxylic acid cross-linking agent be present in an extrudable mixture held at an elevated temperature desired for extrusion, the cross-linking reaction may proceed to an undesirable extent and make the mixture non-extrudable. Cross-linking may provide membranes with improved permeability when the polyamide is swollen with water at the time the cross-linking reaction occurs. Swelling of the membrane may also be accomplished with organic liquids such as ketones, and monohydric and polyhydric alcohols, e.g. alkanols, e.g. propanol, butanol and the like, glycols, glycerol, monoalkyl-terminated glycols or glycol ethers, and the like. A minor amount, say at least about 3 weight percent, of the swelling agent may be in the fibers when cross-linking takes place, preferably this amount is about 5 to 100 weight percent, based on the weight of the fibers.

The polyvinyl alcohols employed in the present invention are essentially water-soluble materials, at least in hot water, and many of these are commercially available. The molecular weights of these polymers are often at least about 1000, and are commonly in the range of about 10,000 to 300,000. Suitable polyvinyl alcohol polymers are described in, for example, "Water-Soluble Resins", Second Edition, Edited by Robert L. Davidson and Marshall Sittig, pages 109 to 115, Reinhold Book Corporation, New York, N.Y. The polyvinyl alcohol may be cross-linked, especially after the fibers are formed. The presence of the cross-linked polyvinyl alcohol may increase the strength of the fibers and increase their resistance to loss of polyvinyl alcohol by leaching during use. The cross-linking agents used may be polycarboxylic acids, preferably those having from 2 to about 12 carbon atoms. The useful acids are preferably water-soluble; and among the polycarboxylic acids, the diacids and triacids, and especially the saturated diacids, are preferred. Included among these are the aliphatic polycarboxylic acids, including oxalic acid, citric acid, maleic acid, malonic acid, and the like. The polyvinyl alcohol may also be cross-linked by reaction with formaldehyde, e.g. by immersing the fibers in an aqueous bath containing 10% Na$_2$SO$_4$ and 3% HCHO, at 50°C. for 1 to 3 hours.

In another method of cross-linking the polyvinyl alcohol, the formed hollow fibers may be combined with the cross-linking agent and the composite can be subjected to heat treatment to effect cross-linking. The temperatures used during cross-linking should be sufficient to enhance the cross-linking reaction to the desired degree, but not such as to affect the fibers detrimentally. The amount of cross-linking agent used may depend upon which agent is chosen, the amount and molecular weight of the polyvinyl alcohol present in the mixture, and the degree of completion of the cross-linking reaction desired. The amount of cross-linking agent generally used may be from about 1 to about 100 weight percent, and preferably from about 5 to about 60 weight percent, based on the weight of the polyvinyl alcohol.

The di(lower alkyl) sulfoxides which may be used to form the membranes of this invention are essentially liquid at ambient temperatures of about 20° to 25°C. Each alkyl group of these materials often has up to about 3 carbon atoms and thus these sulfoxides include dimethyl sulfoxides, diethyl sulfoxide, dipropyl sulfoxide and the like. The use of dimethyl sulfoxide (DMSO) is preferred in this invention.

The semi-permeable fiber membranes of this invention have excellent strength, permeability characteristics and other physical properties which make them specially suitable for use to separate chemicals from various mixtures, and in this use the membranes can be in contact with an aqueous liquid barrier solution which contains complex-forming metal components as ions in solution. Such ions may contain transition metals such as silver or other precious metals, copper or the like. The semi-permeable membranes are essentially impervious to the passage of liquid of liquid but pervious to gases, under the conditions at which the membranes are used. The fiber membranes are sufficiently hydrophilic to hold the liquid barrier solution at least partly, if not essentially entirely, within the fiber membrane. Generally, the fibers will absorb at least about 5, preferably at least about 10, weight percent of water when immersed in distilled water for one day at room temperature and pressure.

The process can be employed to separate various chemicals from other ingredients of a feed mixture providing at least one of the components of the mixture exhibits a complexing rate with the material to be separated or transfer rate across the liquid barrier that is greater than at least one other dissimilar or different component of the feedstock. A pressure differential exists across the liquid barrier-membrane combination with the exit side of the fibers being at a lower pressure than the inlet side. The separated component of the feed mixture is removed from the exit side of the membrane, e.g. by a purge or sweep gas. Quite advantageously, the system can be used to separate aliphatically-unsaturated hydrocarbons from other hydrocarbons which may be aliphatically-saturated or aliphatically-unsaturated, or from non-hydrocarbon materials, including fixed gases such as hydrogen. The feed mixture may thus contain one or more paraffins, including cycloparaffins, mono- or polyolefins, which mat be cyclic or acyclic, and acetylenes or alkynes, and the mixture may include aromatics having such aliphatic configurations in a portion of their structure. Often, the feed mixture contains one or more other hydrocarbons having the same number of carbon atoms as the unsaturated hydrocarbon to be separated or only a one carbon atom difference. Among the materials which may be separated according to this invention are those having 2 to about 8, preferably 2 to 4 carbon atoms such as ethylene, propylene, butenes, butadiene, isoprene, acetylene and the like. These separation procedures are described further in the foregoing cited patent application which is herein incorporated by reference.

The following examples will serve to illustrate the present invention.

EXAMPLE 1

In this example extrusion of the polymer mixture was conducted under a nitrogen pressure between 200 and 1000 psi on a feed tank and with the extruder having a heated head. Hollow fibers of the polymer blend were formed by extrusion through a die having an opening in its center. During extrusion, air or nitrogen was blown through the center of the fiber by passage through a hypodermic needle extending into the opening in the middle of the die. After extrusion the fibers were stretched under their own weight by allowing the fibers to drop below the extruder head. The stretched fibers were crosslinked by immersion in a 3% p-toluene sulfonic acid in 10% aqueous sodium sulfate bath for 60 minutes at 55°C. The fibers were then washed repeatedly with water to remove the salt from them and allowed to dry.

Fibers were made while using two different extruder heads. One head (Head 1) had a hole 0.067 inch in diameter with a 0.031inch O.D. needle in the center of the hole, while the other head (Head 2) had a hole 0.040inch in diameter having a 0.020inch O.D. needle in the center of the hole. During extrusion the polymer compositions are forced through the annular space between the opening in the extruder head and the needle, and air is forced through the needle to keep the extruded hollow fiber from collapsing.

A number of different fibers were extruded using various head temperatures, driving pressures, air flow rates and fiber falling distances for drawing. The compositions employed were formed by mixing the named ingredients at ambient temperature and then raising the temperature of the mixture to approximately 260°F. to effect melting. The mixture is heated at this temperature for at least 1 hour while undergoing vigorous stirring before extrusion. The compositions contained the following:

Table I

| Component | Composition 1 | Composition 2 |
|---|---|---|
| Polyvinyl alcohol (0 to 0.5% acetate) | 80 grams | 40 grams |
| Nylon, Belding BCI-819, an N-methoxy-methyl 6:6 nylon | 120 grams | 160 grams |
| DMSO | 200 ml. | 200 ml. |
| H$_2$O | 20 ml. | 10 ml. |

The polyvinyl alcohol employed was Borden's high molecular weight (0 to 0.5% acetate) grade, and was determined to have a number average molecular weight of about 12,360 by gel permeation chromatography. A 4% aqueous solution of the polymer was determined to have a viscosity of 60 centipoises at 20°C. by the capillary tube technique, which may indicate a molecular weight in the 200,000 range.

The results of these extrusions are given in Tables II and III. Hollow fibers up to 50 feet long were made and were free of holes in the fiber wall and free of plugs in the fiber bore.

Table II

| Batch No. | T°F. Feed Tank | T°F. Head | Extruder Head 1 - Composition 1 T°F. Line to Extruder | Feed Tank Pressure, psig | Drop Dis. inches | Air Rate ml./min. | Fiber O.D |
| --- | --- | --- | --- | --- | --- | --- | --- |
| 86-4 | 260 | 200 | 205 | 150 | 16½" | .191 | .037" |
| 86-5 | 260 | 205 | 210 | 150 | 16½" | .191 | .050" |
| 86-7 | 260 | 210 | 215 | 150 | 16½" | .096 | .047" |
| 86-8 | 260 | 210 | 215 | 150 | 23½" | .096 | .044" |
| 86-10 | 260 | 215 | 220 | 200 | 31" | .096 | .032" |
|  |  |  |  |  | 45" | .096 | .030" |

Table III

| Batch No. | T°F. Feed Tank | T°F. Head | Extruder Head 2 - Composition 2 T°F. Line to Extruder | Feed Tank Pressure, psig | Drop Dis. inches | Air Rate ml./min. | Fiber O.D. |
| --- | --- | --- | --- | --- | --- | --- | --- |
| 98-9 | 260 | 200 | 202 | 300 | 16" | .0382 | .035" |
| 98-11 | 260 | 200 | 202 | 300 | 23½" | .0191 | .033" |
| 98-12 | 260 | 202 | 202 | 350 | 23½" | .0191 | .033" |
| 98-14 | 260 | 204 | 204 | 300 | 16" | .0191 | .029" |
| 98-18 | 260 | 205 | 205 | 300 | 16" | .0096 | .026" |
| 98-20 | 260 | 206 | 206 | 200 | 16" | .0096 | .023" |
| 98-22 | 260 | 206 | 206 | 250 | 16" | .0076 | .024" |

EXAMPLE 2

Four hollow fiber separation test units were prepared, one from each of fiber batches 86-9 and 86-10 (both Composition 1), and two from fiber batch 9822 (Composition 2), see Tables I, II and III. The units were prepared by taking the appropriate dry fiber and potting the ends into separate 2½ × ¼ inches O.D. stainless steel tubes with an epoxy resin. Potting was done in such a manner to insure that after curing, the ends of the fibers could be exposed by the removal of a small amount of the cured potting resin and fiber. The curing of the potting compound was done at room temperature for 24 hours. Each unit was prepared using one fiber with an effective membrane length of 14 inches and an effective area of 4.3 cm². All fibers had been crosslinked before potting by heating at 50°–60°C. in an aqueous bath of 3% p-toluene sulfonic acid and 10% sodium sulfate for 90 minutes. The fibers were thoroughly rinsed in distilled water and dried after crosslinking.

Each fiber unit was soaked for 3 hours in 6M aqueous AgNO$_3$ to activate the fiber for an ethylene separation test. After soaking, the fibers were tested individually in a hollow fiber test cell. Each fiber was supplied with a humidified feed gas mixture of ethane, methane, and ethylene under pressure and at the rate of 10 ml./min. In three of the four units the feed gas was supplied to the inside of the hollow fiber, i.e. the units having fibers 86-9, 86-10 and one of 98-22. In the fourth unit having the other 98-22 fiber the feed gas was supplied to the outside of the fiber. A purge gas stream of 10 ml./min. of nitrogen was continually supplied to the other side of the fiber in each test. The composition of the purge stream exiting the cell was periodically monitored to determine the selectivity of the fibers to ethylene and their permeability. The results of these tests are summarized in Table IV and they show that the hollow fibers can be used as semi-permeable membranes for purifying olefins, especially ethylene.

Table IV

PERFORMANCE OF HOLLOW FIBERS IN
ETHYLENE PURIFICATION
Feed Gas = 18.37% Methane
39.77% Ethylene
41.86% Ethane

| Fiber No. | Feed Pressure, PSIG | Permeate Composition Methane | Ethylene | Ethane | S* | Permeation Rate.** ml./cm².min. |
| --- | --- | --- | --- | --- | --- | --- |
| 86-9 | 10 | 0.06 | 99.77 | 0.17 | 660 | 0.042 |
| 86-10 | 10 | 0.06 | 99.79 | 0.15 | 660 | 0.026 |
| 98-22 (feed inside) | 15 | 0.55 | 95.02 | 4.43 | 29 | 0.00081 |
| 98-22 (feed outside) | 15 | 0.20 | 99.55 | 0.25 | 335 | 0.0026 |

*S=Selectivity= $\left(\dfrac{\text{Methane} + \text{Ethane}}{\text{Ethylene}}\right)_{feed} \times \left(\dfrac{\text{Ethylene}}{\text{Methane} + \text{Ethane}}\right)_{permeate}$

**Based on log mean diameter of 15.15 mils.

EXAMPLE 3

Hollow fibers were formed by extrusion essentially in the manner described in Example 1 using an extrusion mixture having 72 grams of the polyvinyl alcohol, 128 grams of BCI-819 nylon, 209 ml. of DMSO and 21 ml. H$_2$O. The extruded fibers were annealed at 290°F. to remove flaws, dried at 75°C. for 2 hours to remove the solvents and cross-linked by immersion for 60 minutes in a 3% aqueous p-toluene sulfonic acid bath (10% $Na_2SO_4$) at 55°F. The cross-linked fibers were dried.

The fibers were assembled in two test units Unit 1 and Unit 2 in the manner described in Example 2 using Dow-Corning Sylgard 184, a silicone potting resin, to hold the ends of the fibers, there being 4 fibers in each unit. The assembled fibers had an active length of 11 inches. The fibers of Unit 1 and Unit 2 were made using an extruder head having a 0.030 inch diameter hole and 0.016 inch outside diameter needle. The fibers themselves had the following cross sections: those in Unit 1 had an O.D. of 0.020 inch and an I.D. of 0.0055 inch while those in Unit 2 had an O.D. of 0.0177 inch and an I.D. of 0.0093 inch. The active surface area of Unit 1 was about 10 cm² and of Unit 2 and 11.7 cm². The units were stabilized by using them several times to separate ethylene from admixture with ethane and methane after impregnation of the fibers with an aqueous silver nitrate solution.

Two of these units were made and stabilized as described above. The units were then immersed for one hour in 2N aqueous silver nitrate (Unit 2) or a 2N silver nitrate 50% glycerol — 50% water solution (Unit 1), respectively, to impregnate the fibers. The impregnated units were tested for four days in an ethylene separation process in which a methaneethane-ethylene feed flowed down the center of the fibers at 20 psig and at a rate of 10 ml./min. (S.T.P.). A nitrogen purge supersaturated with water passed over the outside of the fibers at atmospheric pressure and at the rate of 10 ml./min. The nitrogen purge gas was super-saturated with water by bubbling the gas purge through a water trap set at 30°C. The purpose of the purge was to pick up the gases permeating the walls of the fibers. A gas chromatographic analysis of the purge provided both the composition and the permeation rate of the gases coming through the fiber walls. During the four day test period the unit having no glycerol (Unit 2) performed better than the other unit.

Both of the test units were then impregnated by contact with a 2N aqueous silver nitrate solution containing 0.3% $H_2O_2$ for 1 hour at 20 psig. This impregnation apparently decreased the glycerol content of the fibers in Unit 1. The units were retested and the operation of Unit 1 was considerably better than that of Unit 2 having no glycerol, and the deactivation rate of Unit 1 was only about one-half of that of Unit 2. The half-life in terms of ethylene permeability for Unit 1 was 12.5 days and for Unit 2 was 5.5 days. The results of these tests are reported in Table V.

Table V

| Unit | Days | % $CH_4$ | Permeate % $C_2H_4$ | % $C_2H_6$ | Permeation Rate ml/cm² min | S. (selectivity) |
|---|---|---|---|---|---|---|
| (Feed | | 20.7 | 35.6 | 43.7) | | |
| 1. (Glycerol) | 0 | 0.32 | 99.11 | 0.57 | .033 | 205 |
| | 1 | 0.30 | 99.22 | 0.48 | .035 | 234 |
| | 2 | 0.38 | 98.99 | 0.62 | .027 | 180 |
| | 3 | 0.43 | 98.94 | 0.63 | .026 | 172 |
| | 4 | 0.42 | 98.85 | 0.73 | .026 | 158 |
| | 7 | 0.50 | 98.67 | 0.83 | .025 | 137 |
| | 8 | 0.57 | 98.55 | 0.88 | .022 | 125 |
| | 9 | 0.59 | 98.06 | 1.35 | .019 | 93 |
| | 10 | 0.61 | 98.27 | 1.12 | .021 | 105 |
| | 11 | 0.71 | 98.08 | 1.21 | .016 | 94 |
| 2. (No glycerol) | 0 | 0.42 | 98.91 | 0.67 | .028 | 167 |
| | 1 | 0.48 | 98.81 | 0.71 | .025 | 153 |
| | 2 | 0.64 | 98.66 | 0.70 | .025 | 135 |
| | 3 | 0.60 | 98.39 | 1.02 | .021 | 112 |
| | 4 | 0.63 | 98.25 | 1.13 | .021 | 103 |
| | 7 | 1.09 | 97.03 | 1.88 | .012 | 60 |
| | 8 | 1.50 | 95.76 | 2.74 | .012 | 42 |
| | 9 | 1.57 | 95.83 | 2.61 | .010 | 42 |
| | 10 | 1.71 | 95.23 | 3.07 | .0096 | 37 |
| | 11 | 1.89 | 95.24 | 2.88 | .0090 | 37 |

These data show that the presence of glycerol increased the permeation rate and selectivity of the separation.

EXAMPLE 4

A mixture containing 75 gms. of the polyvinyl alcohol described in Example 1, 175 gms. of nylon (Belding BCI-819), 250 ml. of dimethyl sulfoxide and 25 ml. of distilled water was stirred for 2 hours at 270°F. in the feed tank of the extruder of Example 1. The extruder was sealed, and the temperature of the extruder tank was set at 250°F. The line between the tank and the extruder head was at 206°F., and the extruder head was at 225°F. The extruder head had an annular opening with the O.D. being 0.050 inch and the I.D. being a hypodermic needle 0.025 inch in outside diameter. During extrusion, air was pumped through the hypodermic needle to maintain the fiber bore open.

Fibers were extruded at the rate at 4 feet/min. when the tank was pressurized with 250 psig of nitrogen, and air was pumped through the hypodermic needle at the rate of 0.061 ml./min. The fiber was allowed to drop 11 inches to stretch it somewhat. After the fiber cooled (at least 30 sec.) it was pulled at a rate of 3.7 feet per minute through a 3-foot long heated furnace maintained at 252°F. This timetemperature combination was sufficient to fuse the polymer particles without distorting the fiber shape. The fiber is under some small stress at this point and does stretch. The final fiber had an O.D. of 0.028 inch. After this melting step, the fibers are fairly elastic and can be stretched further. When stretching was done to a similarly prepared fiber, the resulting fiber had a 0.020 inch O.D.

EXAMPLE 5

A hollow fiber A was extruded essentially in accordance with the procedure described in Example 1 using a mixture containing 65 weight % of BCI-819 nylon and 35 weight % of the polyvinyl alcohol of Example 1 to which was added 95 weight % of DMSO and 15 weight % H₂O based on the total weight of the nylon and polyvinyl alcohol. The fiber was then cross-linked by immersion for 1 hour in a 50°C aqueous bath containing 10% sodium sulfate and 3% p-toluene sulfonic acid. The cross-linked fiber was then washed thoroughly with distilled water. The fiber was swollen by being allowed to stand overnight in a humidified atmosphere before stretching.

Stretching of the fiber was accomplished by feeding it in a water swollen state to a spool 1.5 in. diameter, which in turn fed the fiber to another spool 3.0 in. diameter, which in turn supplied the fiber to a spool 6.0 in diameter. From the last spool the fiber was taken up on 1⅝ inches diameter spool. The first three spools were affixed on the same shaft and thus were maintained at the same angular velocity. The takeup spool was operated at a rate 5 times that of the third spool. A constant stress of 62.5 grams was applied to the fiber before it reached the first spool. Table VI summarizes the diameter changes found for fiber A after stretching.

A second experiment was carried out with a hollow fiber (Fiber B) which was of a composition similar to fiber A and was extruded, annealed and crosslinked in the same manner as fiber A. Fiber B was stored in water for at least 1 hour to produce a swollen condition. A 10-inch section of fiber B was then stretched by hand pulling until the relaxed length of the fiber was 20 inches. The stretching results are also summarized in Table VI.

Table VI

| | | Stretching of Hollow Fibers Change in Diameters. | |
|---|---|---|---|
| | | Outside Diameter (mils) | Inside Diameter (mils) |
| Fiber A, | initial | 24 | — |
| | final | 15 | — |
| Fiber B, | initial | 36 | 12 |
| | final | 24 | 8 |

Fiber B, both unstretched and stretched, was evaluated as a membrane for separating ethylene in a test cell in a manner similar to the procedure described in Example 2. The fiber was secured in the cell by potting with a silicone potting compound (Slygard 184, Dow-Corning Corp.). The cell was filled with 6 M aqueous AgNO₃ and allowed to soak for 60 minutes. This allows AgNO₃ to enter the fiber. The excess AgNO₃ was then removed from the cell. A hydrocarbon feed gas was then supplied to the inside of the hollow fiber at 10 psig and 10 ml./min. The outside of the hollow fiber was continually purged with a humidified 10 ml./min. stream of helium. Sampling of the purge stream exiting the cell was done periodically. The samples were analyzed by gas chromatography. From these analyses the permeation rate for and selectivity to ethylene of the fibers were determined. The results of these tests are summarized in Table VII.

Table VII

PERFORMANCE OF FIBER B AS AN ETHYLENE SELECTIVE MEMBRANE
Feed Gas Composition: Methane 18.6 wt %
Ethylene 39.7 wt %
Ethane 41.7 wt %

| Fiber, Time After Startup | | Area* (Cm²) | Permeate Comp., Wt. % (He-free) | | | S** | Permeation Rate (ml/cm²-min) |
|---|---|---|---|---|---|---|---|
| | | | Methane | Ethylene | Ethane | | |
| Fiber B, | stretched | 4.6 | | | | | |
| | 2 hrs. | | 0.04 | 99.82 | 0.14 | 843 | 0.041 |
| | 6 hrs. | | 0.04 | 99.82 | 0.14 | 842 | 0.045 |
| Fiber B, | unstretched | 5.35 | | | | | |
| | 2 hrs. | | 0.07 | 99.80 | 0.13 | 750 | 0.013 |
| | 6 hrs. | | 0.08 | 99.77 | 0.16 | 666 | 0.018 |

*A = surface area of fiber utilized for the separation
**S = Selectivity, see Table IV It is evident from Table VI that stressing of the cold water swollen fiber produces thinner fibers. Table VII shows that these fibers are both more selective and more permeable to ethylene than unstretched fibers.

EXAMPLE 6

The following compositions were heated at 260°F. for 2 hours with vigorous stirring of the melt:
1.
  192 gms. BCI-819 nylon
  108 gms. PVA of Example 1
  300 mls. DMSO
  30 ml. Distilled H₂O
2.
  192 gms. BCI-819 nylon
  108 gms. PVA of Example 1
  330 mls. DMSO Fibers were made from these compositions in a manner similar to that described in Example 1. The fibers made from composition (1) were white as were the separate polymer powders used; however, the fibers made from composition (2) were yellow to brown and exhibited undesirable degradation. The presence of the water in composition (1) was responsible for the improved results.

EXAMPLE 7

Fibers have been extruded essentially by the method described in Example I. 180 Gms of BCI-819 nylon and 120 gms of the PVA of Example I were tumbled together in a Renco evaporator for 20 minutes. To this mixture was added 500 ml. of a DMSO—H₂O mixture (500 ml. DMSO to 25 ml. H₂O). The mixture was allowed to gel at room temperature for at least 20 hours. The mix was then put into the extruder tank and melted with stirring at 250°F. for at least 2 hours. The tank was sealed and nitrogen pressure (400 psig) forced the melt into a Zenith Laboratory metering pump. The pump drives the melt at a controlled rate through a 50-micron stainless steel filter and out of the extruder head. The head contains an annular die having a hole 0.040 inch in diameter with a 0.016 inch O.D. tubing in the center of the hole, to form the fiber. A syringe pump meters air through the center tubing in the die. The center tubing is a hollow, stainless steel tubing. The air keeps the fiber from collapsing and controls the O.D.-to-I.D. ratio of the fiber. Typical values for the temperature and feed rates for making the fiber are as follows:

$T_{tank} = 250°F.$
$T_{line\ A} = 250°F.$
$T_{pump} = 250°F.$
$T_{line\ B} = 195°F.$
$T_{head} = 170°F.$
Polymer rate = 2.0 ml/min
Air rate = 0.076 ml/min The fibers, once extruded, are stretched by falling from 3 inches to 30 inches to an isopropanol quench bath at 0°C. Fibers are extruded and collected for 30 min and are then soaked an additional 30 min in the 0°C. bath. They are next dried at 75°C. for 2 hours, crosslinked in an aqueous bath (3% p-toluene sulfonic acid plus 10% $Na_2SO_4$) at 55°C. for 1 hour, washed 3 times in distilled water, and air-dried for at least 24 hours.

It is claimed:

1. A process for forming hollow, semi-permeable membrane fibers which comprises extruding a composition through an annular die at an elevated temperature to from said fibers, said composition consisting essentially of hydrophilic polymer and di(lower alkyl) sulfoxide solvent, said polymer consisting essentially of N-alkoxyalkyl polyamide and sufficient water-soluble polyvinyl alcohol to enhance the hydrophilic properties of the polyamide, said composition having a sufficient amount of water to inhibit degradation of the polymer at elevated temperature.

2. A process for forming hollow, semi-permeable membrane fibers of claim 1 in which the extruding through an annular die is at a temperature of about 60° to 125°C.

3. A process of claim 2 in which the di(lower alkyl) sulfoxide is dimethyl sulfoxide and the amount of water is about 1 to 30 weight % based on the total weight of the dimethyl sulfoxide and water.

4. A process of claim 3 in which the polymer has about 30 to 85 weight % of said polyamide and about 15 to 70 weight % polyvinyl alcohol based on their total.

5. A process of claim 4 in which the dimethyl sulfoxide is about 70 to 400 weight % based on the total polyamide and polyvinyl alcohol.

6. A process of claim 5 in which the polyamide is an N-methoxymethyl polyamide.

7. A process for forming hollow, semi-permeable membrane fibers which comprises extruding a composition through an annular die at an elevated temperature to form said fibers, said composition comprising polymer having about 30 to 85 weight percent of N-alkoxyalkyl polyamide and about 15 to 70 weight percent of water-soluble polyvinyl alcohol based on their total, about 70 to 400 weight percent of di(lower alkyl) sulfoxide based on the total weight of the polyamide and polyvinyl alcohol, and about 1 to 30 weight percent of water based on the total weight of the water and di(lower alkyl) sulfoxide.

8. A process for forming hollow, semipermeable membrane fibers of claim 7 in which the extruding through an annular die is at a temperature of about 70° to 110°C.

9. A process of claim 8 in which the di(lower alkyl) sulfoxide is dimethyl sulfoxide.

10. A process of claim 9 in which the polymer has about 40 to 70 weight % of said polyamide and about 30 to 60 weight % polyvinyl alcohol based on their total.

11. A process of claim 10 in which there is about 90 to 250 weight % dimethyl sulfoxide based on the total weight % of the polyamide and polyvinyl alcohol, and about 2 to 20 weight % water based on the total weight of the water and dimethyl sulfoxide.

12. A process of claim 11 in which the polyamide is an N-methoxymethyl polyamide.

* * * * *

UNITED STATES PATENT OFFICE
CERTIFICATE OF CORRECTION

PATENT NO. : 3,940,469
DATED : February 24, 1976
INVENTOR(S) : Edward F. Steigelmann, et al It is certified that error appears in the above-identified patent and that said Letters Patent are hereby corrected as shown below:

Issue date of the patent "February 24, 1975" should be
-- February 24, 1976 --

Column 15 - Line 20   "from" should be -- form --

Signed and Sealed this first Day of June 1976

[SEAL]

Attest:

RUTH C. MASON
*Attesting Officer*

C. MARSHALL DANN
*Commissioner of Patents and Trademarks*